United States Patent [19]

Yanagita et al.

[11] Patent Number: 5,170,109

[45] Date of Patent: Dec. 8, 1992

[54] METHOD OF CONTROLLING ROBOT IN EVENT OF A POWER FAILURE

[75] Inventors: Akihiro Yanagita; Yoshiki Hashimoto; Hiroji Nishi, all of Minamitsuru, Japan

[73] Assignee: Fanuc Ltd., Minamitsuru, Japan

[21] Appl. No.: 781,169

[22] PCT Filed: Mar. 1, 1991

[86] PCT No.: PCT/JP91/00303

§ 371 Date: Oct. 15, 1991

§ 102(e) Date: Oct. 15, 1991

[87] PCT Pub. No.: WO91/13732

PCT Pub. Date: Sep. 19, 1991

[30] Foreign Application Priority Data

Mar. 8, 1990 [JP] Japan .................................. 2-57369

[51] Int. Cl.$^5$ ............................................. B25J 19/06
[52] U.S. Cl. ................................. 318/568.1; 318/563; 318/565; 395/89; 307/64; 901/3
[58] Field of Search .................... 318/560–572, 318/434; 395/80–99; 361/80–92; 901/3, 6, 9, 15–23, 49; 307/64, 66

[56] References Cited

U.S. PATENT DOCUMENTS

| | | | |
|---|---|---|---|
| 4,453,117 | 6/1984 | Elms et al. | 318/434 X |
| 4,636,699 | 1/1987 | Kato | 318/563 X |
| 4,638,227 | 1/1987 | Katayama et al. | 318/565 |
| 4,697,979 | 10/1987 | Nakashima et al. | 901/3 X |
| 4,751,652 | 6/1988 | Kiya et al. | 318/563 |
| 4,888,531 | 12/1989 | Hormann | 318/282 |
| 5,017,848 | 5/1991 | Takahashi | 318/568.1 |
| 5,038,272 | 8/1991 | Calcagno et al. | 318/563 |
| 5,075,870 | 12/1991 | Kojyo et al. | 395/89 |

*Primary Examiner*—Paul Ip
*Attorney, Agent, or Firm*—Staas & Halsey

[57] ABSTRACT

Disclosed is a method of controlling a robot, for restarting the robot by resupplying an electric power in the event of a power failure. When a power failure detection circuit detects that a voltage has dropped or has been cut off, the circuit notifies an operating method (OS) of this (S1) and the OS writes a power failure flag to a non-volatile memory and stops a task being performed (S2). The data of the task being performed is saved in the non-volatile memory. After the electric power has been resupplied (S10), the OS executes a power failure processing for itself, with reference to the power failure flag (S11), initializes hardware (S12), executes a power failure processing routine for each task (S13), and restarts the operation of the robot from the position at which the robot was stopped when the power failure occurred (S14).

4 Claims, 2 Drawing Sheets

METHOD OF CONTROLLING ROBOT IN EVENT OF A POWER FAILURE

TECHNICAL FIELD

The present invention relates to a method of controlling a robot in the event of a power failure, by restarting the operation of the robot by resupplying an electric power thereto, and more specifically, to a method of controlling a robot in the event of a power failure by which the operation of the robot can be restarted after an electric power has been supplied to the robot, without the need for a robot controller for saving various data at all times during an operation thereof.

BACKGROUND ART

A factory using industrial robots is generally equipped with many apparatuses requiring a large amount of electric power, and thus the probability of the occurence of a power failure therein is high. Once a power failure occurs, the operation of the robots cannot be restarted in the same state as before, even if an electric power has been again supplied thereto, and thus the operator must carry out the procedures necessary for restarting the operation thereof. Consequently, when many industrial robots are used in a large manufacturing line, the restarting of the operation of the robots takes a long time, which causes a problem in the management of the factory.

To simply restart the operation, there is used a method of saving the data of a task processed by a procedessor, at predetermined intervals, in a non-volatile memory or the like. More specifically, when a power failure occurs, the data saved in the non-volatile memory is read out and the processing state when the power failure occurred is restored, and thus the operation of a robot can be restarted in the same state as before.

Nevertheless, when a robot is controlled by a complex method, the number of data to be saved is increased and the data must be saved at very short intervals, and thus the load on a processor is increased. When the intervals at which the data is saved are increased, a time lag between a time at which data is saved and a time at which a power failure occurs is also increased, and thus the robot cannot be correctly restarted in the same state as before.

DISCLOSURE OF THE INVENTION

Taking the above into cosideration, an object of the present invention is to provide a method of controlling a robot in the event of a power failure, by which the operation of a robot can be restarted after an electric power has been resupplied to the robot, without the need for a robot controller to save various data during the operation thereof.

To attain the above object, according to the present invention, there is provided a method of controlling a robot in the event of a power failure, for restarting the robot by resupplying an electric power, which method comprises the steps of, detecting by a power failure detecting circuit that a voltage has dropped or an input power supply has been cut off, notifying an operating system (OS) through the power failure detection circuit of the interruption of the power failure detection, writing a power failure flag to a non-volatile memory and stopping a task being performed, by the OS, causing the OS to execute a power failure processing for the OS with reference to the power failure flag after electric power has been resupplied, initializing hardware by the OS, executing a power failure processing routine by each task in accordance with an instruction from the OS, and operating the robot by the OS from the point at which the robot was stopped when the power failure occurred.

When the power failure detection circuit detects that a voltage has dropped or the power has been cut off, the circuit notifies the operating method (OS) of this event and the OS writes a power failure flag to a non-volatile memory and stops a task being performed. The data of the task being performed is saved in the non-volatile memory.

After an electric power has been resupplied to the robot, the OS executes a power failure processing of itself with reference to the power failure flag, initializes hardware, executes a power failure processing routine of each task, and restarts the operation of the robot from the position at which it was stopped when the power failure occurred.

BEST MODE OF CARRYING OUT THE INVENTION

An embodiment of the present invention will be described below with reference to the drawings.

Figure 2:
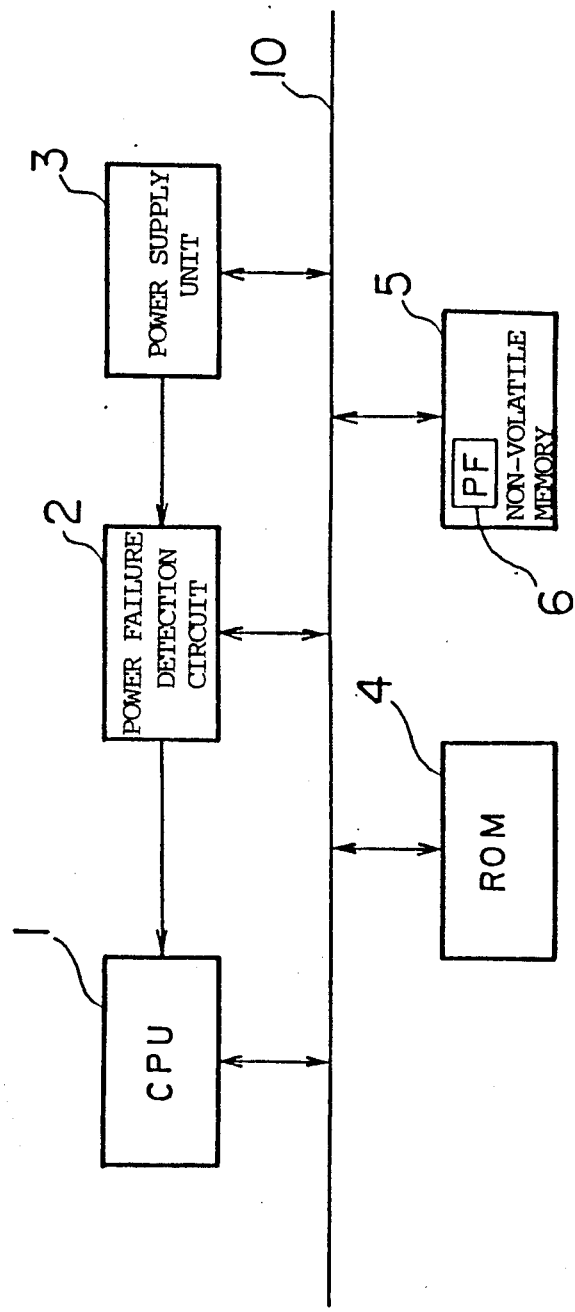
FIG. 2 is a block diagram of hardware of a robot controller embodying the present invention.

FIG. 2 is a block diagram of hardware of a robot controller embodying the present invention. A processor 1 for controlling the robot controller as a whole controls a robot in accordance with a system program stored in a ROM 4. A power failure detection circuit 2 monitors an AC voltage from an electric power supply unit 3 at all times, and supplies an interrupt signal to the processor 1 when the AC voltage drops below a predetermined value or is cut off. The processor 1, or an OS operating on the processor 1, stops a task being performed and writes a power failure flag (PF) 6 to a non-volatile memory 5. The data needed by the task being performed in the event of a power failure is saved in the non-volatile memory 5.

Next, when the power supply is restored and electric power is resupplied, the OS reads out the power failure flag (PF) 6 to execute a power failure processing and restart the operation of the robot.

Figure 1:
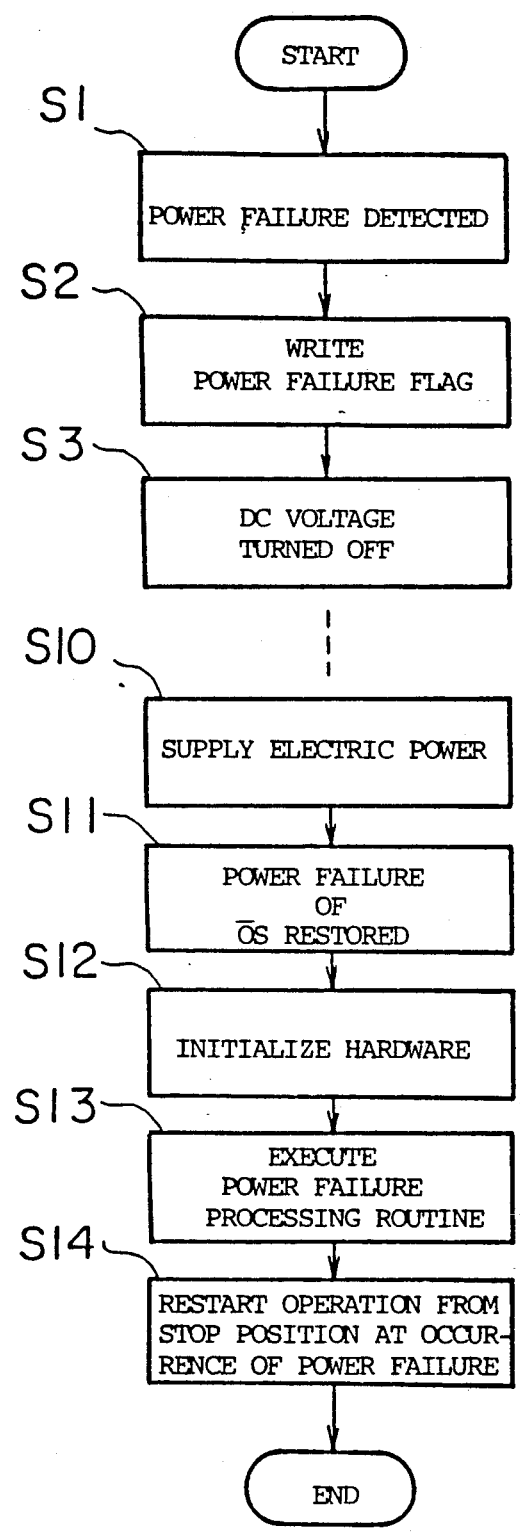
FIG. 1 is a flowchart of a method of controlling a robot in the event of a power failure, according to the present invention.

Next, the power failure processing will be described. FIG. 1 is a flowchart of a method of controlling a robot in the event of a power failure, according to the present invention, wherein numerals prefixed with an S indicate the numbers of steps of the process.

[S1] The power failure detection circuit 2 monitors an AC voltage from the power supply unit 3 at all times, and supplies a power failure detection signal to the processor 1 when the AC voltage drops below the predetermined value or is cut off.

[S2] The OS on the processor 1 stops a task being performed, saves the necessary data in the non-volatile memory 5, and further, writes the power failure flag (PF) 6 to the non-volatile memory 5. Note that data of other tasks not being performed, which is needed for restarting them, is saved in the non-volatile memory 5 when each of the tasks has been executed. Even if the AC power supply is cut off, a DC voltage output from the power supply unit 3 is supplied for a predetermined time, and thus these processings are executed while the DC voltage output is supplied.

[S3] The DC voltage output from the power supply unit 3 is completely cut off.

[S10] The power failure is recovered and an electric power is resupplied to the robot controller.

[S11] The OS reads out the power failure flag (PF) 6 in the non-volatile memory 5 and executes a power failure processing for itself.

[S12] Next, the OS initializes hardware. For example, a servo control program stored in the ROM of a servo motor control circuit is loaded to a RAM. Further, a display unit causes a display of a power failure message on a display screen.

[S13] The power failure processing routine for each task is executed. The data needed for restating the task being performed when the power failure occurred is saved in the non-volatile memory 5 when the power failure processing is carried out. Further, the data of tasks not being performed when the power failure processing was carried out is saved in the non-volatile memory 5 when each of these tasks has been executed, and therefore, the power failure processing routine of each task is executed by reading the above data.

[S14] The power failure processing routine of each task has been executed and the necessary data gathered, and thus the operation of the robot is restarted from the position at which the robot was stopped when the power failure occurred.

Accordingly, the operation of the robot can be restarted from the position at which the robot was stopped when the power failure occurred without the need for saving at all times the data needed for restarting the robot, at predetermined intervals, and thus a time needed for restarting the robot can be shortened.

As described above, according to the present invention, since the OS writes a power failure flag to the non-volatile memory when a power failure occurred, and reads out the flag after an electric power has been resupplied, to thus execute a power failure processing, the operation of the robot stopped by a power failure can be restarted simply and in a short time.

Further, the necessary data need not be saved at predetermined intervals, and thus a load on the processor is reduced.

What is claimed is:

1. A method of controlling a robot for restarting the robot by resupplying an electric power thereto in the event of a power failure, comprising the steps of:

- detecting by a power failure detecting circuit that a voltage has dropped or an input power supply has been cut off;
- notifying an operating system (OS) through said power failure detection circuit of the detection of a voltage drop or power failure;
- using said OS to write a power failure flag to a non-volatile memory and to stop a task being performed after said OS has been notified of the detection of a voltage drop or power failure;
- causing said OS to execute a power failure processing for said OS with reference to said power failure flag after the voltage has been restored or electric power has been resupplied;
- initializing hardware by said OS;
- executing a power failure processing routine by each task in accordance with instructions from said OS; and
- operating said robot by said OS from the point at which said robot was stopped when the power failure occurred.

2. A method of controlling a robot in the event of a power failure according to claim 1, wherein said step of initializing said hardware includes a step of loading a servo control program in a servo motor control circuit from a ROM to a RAM.

3. A method of controlling a robot in the event of a power failure according to claim 1, wherein said step of initializing said hardware includes a step of making a display unit to realize a display of a power failure message on a display screen.

4. A method for controlling a robot and for restarting the same after power failure, said method comprising:

- directing the operation of said robot using instructions from a conventional operating system powered by electrical energy from a general source;
- detecting a voltage condition or a power supply cut off condition in said electrical energy from said general source;
- notifying said operating system of a said voltage drop condition or a said power supply cut off condition;
- using said operating system to stop the operation of the robot and to write a power failure flag to a non-volatile memory upon being notified of a said condition;
- supplying electrical energy from a second source to power said operating system in response to detection of a said condition;
- causing said operating system to execute a restarting program for said robot using information from said flag when electrical energy from said general source once again becomes available, to thereby cause said robot to resume operation from the point at which it was stopped by the operating system when it was notified of a said condition.

* * * * *